United States Patent [19]

Lee et al.

[11] Patent Number: 5,605,737
[45] Date of Patent: Feb. 25, 1997

[54] WHITE-COLORED POLYMER FILM

[75] Inventors: Young-Jin Lee; Sang-Il Kim, both of Kyungki-do; Bum-Sang Kim, Seoul, all of Rep. of Korea

[73] Assignee: SKC Limited, Kyungki-do, Rep. of Korea

[21] Appl. No.: 629,246

[22] Filed: Apr. 8, 1996

[30] Foreign Application Priority Data

Apr. 18, 1995 [KR] Rep. of Korea ............... 95-9133

[51] Int. Cl.$^6$ ............................................. B32B 1/00
[52] U.S. Cl. ........................ 428/188; 264/41; 264/45.9; 264/46.1; 524/166; 524/912; 525/177
[58] Field of Search ............................ 524/166, 912; 525/177; 428/116, 118, 319.7, 319.9, 188; 264/41, 45.9, 46.1, 414

[56] References Cited

U.S. PATENT DOCUMENTS

| | | | |
|---|---|---|---|
| 4,368,295 | 1/1983 | Newton et al. | 525/177 |
| 4,572,852 | 2/1986 | Gartland et al. | 525/177 |
| 4,921,652 | 5/1990 | Tsuji et al. | 264/41 |
| 4,921,653 | 5/1990 | Aoyama et al. | 264/41 |
| 5,134,173 | 7/1992 | Joesten et al. | 264/41 |
| 5,238,618 | 8/1993 | Kinzer | 264/41 |
| 5,366,789 | 11/1994 | Mackinnon | 428/188 |
| 5,397,610 | 3/1995 | Odajima et al. | 525/177 |

FOREIGN PATENT DOCUMENTS 57-49648  3/1982  Japan .
58-50625  3/1983  Japan .

Primary Examiner—Veronica P. Hoke
Attorney, Agent, or Firm—Anderson, Kill & Olick P.C.

[57] ABSTRACT

A white-colored porous polymer film having elongated spherical pores, which is characterized in that said pores exposed on a surface created by cutting the film along longitudinal direction satisfy the following formulae, possesses a low density, good surface and mechanical property and good processability:

$P_{L,90} \geq 5\ \mu m$      $P_{D,90} \geq 0.1\ \mu m$ $P_{L/D,50} \geq 5$      $100 \geq P_N \geq 10$ $0.5 \geq P_A \geq 0.05$ wherein, $P_{L,90}$ is an average length of longer axes of 90% or more of the exposed pores;

$P_{D,90}$ is an average length of shorter axes of 90% or more of the exposed pores;

$P_{L/D,50}$ is an average of the longer axis to the shorter axis length ratios of the exposed pores;

$P_N$ is the number of exposed pores per 1000 $\mu m^2$ of the exposed surface; and $P_A$ is the ratio of the exposed pore area to the exposed surface area.

The polymer film of the present invention comprises a polyester and polyolefin resin mixture, inorganic particles, a metal sulfonate and a hindered phenol.

5 Claims, No Drawings

WHITE-COLORED POLYMER FILM

FIELD OF THE INVENTION

The present invention relates to a white-colored polymer film having improved surface properties and printability, which is useful as a paper substitute, by way of controlling pores present in the film to a specified form.

BACKGROUND OF THE INVENTION

Polyesters such as polyethylene terephthalate (PET) and polyethylene naphthalate (PEN) are known to possess good chemical stability, physical and mechanical strength, durability, heat resistance, chemical resistance, weather resistance and electrical insulation property; and, therefore, have been widely used in manufacturing various articles including medical devices, capacitors, packaging and labelling materials, photographic film and magnetic recording media.

Recently, polyester films have been increasingly used as paper substitutes in a variety of applications. However, conventional polyester films are inferior to paper in clarity, color, density and rigidity and, therefore, extensive attempts have been made to develop a polyester film having paper-like softness while maintaining the mechanical strength, heat resistance, durability and the other desirable properties of the polyester. For example, Japanese Patent Laid-open Publication No. 50625/1983 discloses a method for preparing a polyester film by incorporating a foaming agent therein; and Japanese Patent Laid-open Publication No. 49648/1982 offers a method for preparing a polyester film with improved surface properties by blending a polyolefin resin with a polyester resin and extending the resultant mixture to form pores on the surface as well as inside of the film obtained therefrom, and optionally incorporating therein a thermal stabilizer.

However, such attempts have their own drawbacks and problems. In case a foaming agent is incorporated in a polyester film, the pores formed tend to be unevenly dispersed and physical properties of the film are difficult to control. Further, in case a polyolefin resin is blended with a polyester resin, the properties of the resulting polymer film are apt to deteriorate due to poor heat resistance of the polyolfin component. Also, since a polyolefin tends to generate and accumulate static electricity, the film prepared from a polyester blended with a polyolfin may suffer from electrostatic and low printability problems, limiting its usage as a paper substitute.

The present invention is based on a discovery that the surface property of a film is intimately related to the size, shape and distribution of pores present in the film. If the distribution of pores in the film is not suitably designed, then a polymer film having paper-like softness, desirable surface properties and good processability cannot be obtained.

SUMMARY OF THE INVENTION

It is, therefore, a primary object of the present invention to provide a white-colored polymer film having a low density, good antistatic property, printability, and processability, which is suitable for use as a paper substitute, by way of controlling the size, shape and distribution of pores present in the film within their respective specified ranges.

In accordance with the present invention, there is provided a polymer film having elongated spherical pores, which is characterized in that said pores exposed on a surface created by cutting the film along a longitudinal direction satisfy the following formulae:

$P_{L,90} \geq 5\ \mu m$   $P_{D,90} \geq 0.1\ \mu m$ $P_{L/D,50} \geq 5$   $100 \geq P_N \geq 10$ $0.5 \geq P_A \geq 0.05$ wherein, $P_{L,90}$ is an average length of longer axes of 90% or more of the exposed pores;

$P_{D,90}$ is an average length of shorter axes of 90% or more of the exposed pores;

$P_{L/D,50}$ is an average of the longer axis to the shorter axis length ratios of the exposed pores;

$P_N$ is the number of exposed pores per 1000 $\mu m^2$ of the exposed surface; and $P_A$ is the ratio of the exposed pore area to the exposed surface area.

The polymer film of the present invention may be prepared by compounding and melt-extruding a resinous composition comprising a mixture of 65 to 95% by weight of a polyester resin and 5 to 35% by weight of a polyolefin resin, and, based on the weight of the polyester resin, 0.01 to 10% by weight of inorganic particles, 0.01 to 1.0% by weight of a metal sulfonate and 0.005 to 0.5% by weight of a hindered phenol, to form a sheet, and then extending the sheet into the film.

DETAILED DESCRIPTION OF THE INVENTION

A polyester resin suitable for use in the present invention may be prepared by polycondensation of an acid component, such as a dialkyl ester of an aromatic dicarboxylic acid, with a diol component, such as an aliphatic glycol, and the polyester resin may be employed in an amount ranging from 65 to 95% by weight, preferably 75 to 92% by weight of the polyester-polyolefin resin mixture.

Representative dialkyl esters of aromatic dicarboxylic acid which may be employed in the present invention include: dialkyl esters of terephthalic acid, isophthalic acid, naphthalenedicarboxylic acid, cyclohexanedicarboxylic acid, diphenoxyethanedicarboxylic acid, biphenyldicarboxylic acid, diphenyl ether dicarboxylic acid, anthracenedicarboxylic acid and $\alpha,\beta$-bis(2-chlorophenoxy)ethane-4,4'-dicarboxylic acid. Among them, dimethyl terephthalate and dimethyl 2,5-naphthalenedicarboxylate are most preferred.

Exemplary aliphatic glycols which may be used in the present invention are ethylene glycol, trimethylene glycol, tetramethylene glycol, pentamethylene glycol, hexamethylene glycol and hexylene glycol. Among them, ethylene glycol is most preferred.

A preferred polyester for use in the present invention includes at least 70% by weight of ethylene terephthalate or ethylene naphthalate repeating units and the remainder of copolymeric repeating units may be derived from other di- or polycarboxylic acids or oxycarboxylic acids as well as other diols. Such di- and polycarboxylic acids and oxycarboxylic acids may include: 4,4'-dicarboxylbenzophenone, adipic acid, sebacic acid, trimelitic acid, pyromelitic acid, sodium 3,5-(hydroxycarbonyl)benzene sulfonate, p-hydroxybenzoic acid and the like; and said other diols include propyleneglycol, neopentylglycol, diethyleneglycol, cyclohexandimethanol, p-xyleneglycol, 5-sodium sulforesorcin and the like.

Suitable polyolefin resins for the polymer film of the present invention may include a copolymer of two or more components selected from ethylene, propylene, butene, pentene, hexene and octene. The preferred olefin resin is an ethylene copolymer with an ethylene monomer content of 10 to 15%. Further, the olefin resin preferably has a melt index ranging from 1.0 to 25 g/10 min (200° C., 5 kg). In order to make the pores present in the film to be uniformly dispersed, the polyolefin resin may be employed in an amount ranging from 5 to 35% by weight, preferably from 8 to 25% by weight of the resin mixture. The polyolefin resin incorporated in the polymer film imparts improved surface properties as well as low density to the film.

In order to introduce improved optical and frictional properties into the film, the polymer film of the present invention may comprise inert inorganic particles having an average particle diameter ranging from 0.01 to 10 μm in an amount ranging from 0.01 to 10% by weight based on the weight of the polyester resin employed. Representative inorganic particles include: particles of barium sulfate, titanium oxide, silicon dioxide, calcium carbonate, magnesium oxide, talc, zeolite and the like.

The polymer film of the present invention may further comprise, as an antistatic agent, a metal sulfonate of formula (I) having an acid value of 1.0 mg KOH/g or less:

$$R_1\text{—}SO_3Me \quad (I)$$

wherein, $R_1$ is a $C_5$–$C_{20}$ alkyl group; and

Me is an alkali metal or alkaline earth metal selected from Li, Na, K and Mg.

Suitable metal sulfonates may include: potassium octylbenzenesulfonate, potassium nonylbenzenesulfonate, potassium undecylbenzenesulfonate and a mixture thereof. Incorporation of such metal sulfonate improves the antistatic property and increases surface tension of the film, thereby reducing the risk of losing information recorded on the film surface, e.g., in a magnetic card, and improving the receptivity of ink and other coating compositions. The metal sulfonate may be added in an amount ranging from 0.01 to 1.0% by weight, preferably from 0.02 to 0.5% by weight based on the weight of the polyester resin.

The polymer film of the present invention may also comprise a hindered phenol derivative, which inhibits radical chain reactions, thereby imparting anti-oxidant and heat-resistant properties to the film. Examples of the hindered phenol derivative include: tetrakis(3,5-di-t-butylhydroxyphenylpropanoyloxymethyl)methane, octadecyl 3,5-di-t-butyl-4-hydroxyphenylpropanoate, 2-hydroxy-4-n-octyloxybenzophenone and 2,4-di-t-butylphenyl 3,5-di-t-butyl-4-hydroxybenzoate, and a mixture thereof. The hindered phenol derivative may be employed in an amount ranging from 0.005 to 0.5% by weight based on the weight of the polyester resin.

In addition to the above components, the polymeric film of the present invention may further comprise other common additives such as polycondensation catalyst, dispersing agent, other anti-static agent, crystallization accelerator, nucleating agent and/or anti-blocking agent, in effective amounts which do not adversely affect the desired characteristics of the inventive film.

As previously described, when a mixture of the polyolefin and polyester resins is subjected to extrusion and extension processes to form a film, elongated spherical pores are formed on the surface and in the inside of the film. In accordance with the present invention, in order to provide a polymer film having a paper-like surface properties as well as a good processability, the film is prepared so that exposed pores on a surface created by cutting the film along a longitudinal direction satisfy the following formulae:

$$P_{L,90} \geq 5\ \mu m \qquad P_{D,90} \geq 0.1\ \mu m$$
$$P_{L/D,50} \geq 5 \qquad 100 \geq P_N \geq 10$$
$$0.5 \geq P_A \geq 0.05$$

wherein, $P_{L,90}$ is an average length of longer axes of 90% or more of an exposed pores;

$P_{D,90}$ is an average length of shorter axes of 90% or more of the exposed pores;

$P_{L,D,50}$ is an average of the longer axis to the shorter axis length ratios of the exposed pores;

$P_N$ is the number of exposed pores per 1000 μm² of the exposed surface; and $P_A$ is the ratio of the exposed pore area to the exposed surface area.

The polymer film of the present invention having pores satisfying the above specified conditions may be prepared by a process which comprises: compounding a polyester resin together with a polyolefin resin to give a primary resin mixture; remelting and extruding the primary resin mixture into an amorphous cast sheet; and then extending the sheet in both longitudinal and transverse directions to form the film.

The additive components, i.e., inert particles, metal sulfonate, hindered phenol and the like, may be added to the polyester resin at any time before terminating the polycondensation of raw materials: preferably, they may be added immediately after the transesterification step, or at the beginning of the polycondensation step. The resultant polyester resin composition is then subjected to a compounding procedure with any of the above-mentioned polyolefin resins.

The compounding of the resin mixture is preferably conducted by using a conventional method, e.g., by using a twin screw compounder. In the compounding process, the initial input and final output temperatures may range from 200° to 250° C. and from 215° to 260° C., respectively, and the screw rotation speed and the extrusion rate may be controlled so that the temperature of the extruded resin lies within the range of 225° to 285° C. Thereafter, the melt-extruding of the resulting resin mixture may be conducted in accordance with a conventional method, e.g., by using a T-die method well known in the art, to provide a sheet. The sheet is passed through rollers to extend the resin in both longitudinal (film proceeding) and traverse directions in a draw ratio of 2.0 to 5.0, thus providing a biaxially oriented polymer film.

In preparing the polymer film in accordance with the present invention, the conditions of the melt-extrusion, casting, and biaxial extension steps may be suitably determined by persons skilled in the art.

The following Examples are intended to illustrate the present invention more specifically, without limiting the scope of the invention.

In the Examples and Comparative Examples, the properties of the polymer films produced were evaluated in accordance with the following methods.

1. Size and area of pores

The size and area of pores present in a polymer film were evaluated by examining the surface created by cutting the film in the longitudinal direction with a scanning electronic microscope and an image analyzer to determine $P_{L,90}$, $P_{D,90}$, $P_{L/D,50}$, $P_N$ and $P_A$ of the pores.

2. Average Particle Diameter

The average particle diameter was measured as a volumetric average diameter(μm) by examining particles slurried in ethylene glycol with a centrifugation type granulometer SA-CPII (a product of Shimadzu, Japan).

3. Bulk Density

The bulk density of a film was measured by a floating method while maintaining a density gradient column comprised of carbon tetrachloride and n-heptane at 25° C.

4. Antistatic property

The surface resistance of a film was measured with an insulation resistance measurement apparatus (Hewlett-Packard Company, U.S.A.) at 20° C. and 65% relative humidity. The applied voltage was 500 V. The measured value was given in ohm($\Omega$) unit. As the surface resistance of a film decreases, the anti-static property thereof increases.

5. Strength at breakage

The strength at breakage of a film was determined by measuring the tensile strength of the film in accordance with ASTM D882 using UTM4206(Instron).

6. Processability

The frequency of breakages during a film making process was measured and the processability was judged on the basis of the following:

A : less than once a day
B : 2–5 times a day
C : 6–10 times a day
D : more than 10 times a day

EXAMPLE 1

Dimethyl terephthalate and ethylene glycol were mixed in an equivalent ratio of 1:2 and transesterified in the presence of a transesterification catalyst to form a polyethylene terephthalate monomer, i.e., bis-2-hydroxyethyl terephthalate. To the resultant, were added 16 g of titanium oxide of cubic crystalline structure having an average particle diameter of 0.5 μm, 0.64 g of tetrakis(3,5-di-t-butylhydroxyphenylpropanoyloxymethyl)methane, 0.64 g of potassium octylbenzenesulfonate and 0.05% by weight, based on the weight of the polyethylene terephthalate monomer, of antimony trioxide as a polycondensation catalyst, and the resulting mixture was polycondensed to obtain a polyethylene terephthalate resin having an intrinsic viscosity of 0.610 dl/g. 320 g of the polyethylene terephthalate resin thus obtained was compounded with 80 g of propylene-ethylene copolymer resin (ethylene content of 10 mol %) having a melt flow index of 8.0 g/10 min using a conventional compounding method to give a primary resin mixture while maintaining the initial input temperature at 245° C., the final output temperature at 260° C. and the temperature of the extruded resin at 275° C.

The primary resin mixture was then re-melted and extruded using a T-die method to form a cast sheet. The sheet was extended in a draw ratio of 3.5 in both the longitudinal and transverse directions to provide a biaxially oriented polymer film having a thickness of 100 μm.

The film thus prepared exhibited excellent properties as shown in Table 1.

EXAMPLE 2

The procedure of Example 1 was repeated except that dimethyl 2,5-naphthalenedicarboxylate was employed in place of dimethyl terephthalate to obtain a polyethylene naphthalate having an intrinsic viscosity of 0.580 dl/g. The polyethylene naphthalate resin was compounded while maintaining the input temperature at 250° C., the output temperature at 265° C. and the temperature of the extruded resin at 280° C., followed by biaxially extending the resin sheet in a draw ratio of 4.0.

The film obtained in this Example also exhibited excellent properties as shown in Table 1.

EXAMPLES 3 AND 4

The procedure of Example 1 was repeated except for varying the types and amounts of the additive components as well as the parameters of the preparation process within the scope of the present invention, as shown in Table 1.

The films obtained in these Examples also exhibited excellent properties as shown in Table 1.

COMPARATIVE EXAMPLES 1 AND 6

The procedure of Example 1 was repeated except for varying the types and amounts of the additive components as well as the parameters of the preparation process outside the scope of the present invention, as shown in Table 1.

The films thus obtained exhibited poor properties in general as shown in Table 1.

TABLE 1

| | | Base Resin | Additives* Inorganic particle type | wt % | OBS-K wt % | TK-M wt % | Polyolefin Resin** Type | wt % | M.I. g/10 min | Draw ratio L. | T. | Shape and size of pores $P_{L,90}$ μm | $P_{D,90}$ μm | $P_{L/D,50}$ | $P_N$ | $P_A$ |
|---|---|---|---|---|---|---|---|---|---|---|---|---|---|---|---|---|
| Ex. | 1 | PET | TiO$_2$ | 5 | 0.20 | 0.20 | PP-PE random | 20 | 4.5 | 3.5 | 3.5 | 21 | 2 | 10 | 43 | 0.08 |
| | 2 | PEN | TiO$_2$ | 5 | 0.20 | 0.20 | PP-PE random | 20 | 4.5 | 4.0 | 4.0 | 27 | 3 | 9 | 36 | 0.06 |
| | 3 | PET | TiO$_2$ | 5 | 0.20 | 0.20 | PP-PE random | 15 | 6.0 | 3.5 | 3.5 | 19 | 2 | 9 | 52 | 0.07 |
| | 4 | PET | BaSO$_4$ | 7 | 0.20 | 0.20 | PP-PE random | 15 | 6.5 | 3.5 | 3.5 | 20 | 2 | 10 | 56 | 0.08 |
| Com. Ex. | 1 | PET | TiO$_2$ | 5 | 0.20 | 0.20 | PP homo | 3 | 20.5 | 3.5 | 3.5 | 14 | 3 | 3 | 8 | 0.03 |
| | 2 | PET | TiO$_2$ | 5 | | | PP-PE random | | | | | 13 | 3 | 5 | 13 | 0.03 |
| | 3 | PET | TiO$_2$ | 5 | 0.20 | 0.85 | PP-PE random | 20 | 0.5 | 3.5 | 3.5 | 20 | 2 | 10 | 26 | 0.08 |

TABLE 1-continued

| | | | | | | | | | | |
|---|---|---|---|---|---|---|---|---|---|---|
| 4 | PET | BaSO$_4$ | 5 | PP-PE random | | 13 | 2 | 6 | 64 | 0.04 |
| 5 | PET | TiO$_2$ | 5 | | | 16 | 6 | 3 | 40 | 0.04 |
| 6 | PET | TiO$_2$ | 5 | | | 37 | 2 | 17 | 52 | 0.10 |

| | | | Physical Property | | | | |
|---|---|---|---|---|---|---|---|
| | | Processability | Density g/ml | Resistance Ω | Strength kg/mm$^2$ | Softness | Uniformity |
| Ex. | 1 | A | 1.00 | 10$^{12}$ | 18.9 | GOOD | A |
| | 2 | A | 1.01 | 10$^{12}$ | 25.5 | GOOD | A |
| | 3 | A | 1.04 | 10$^{12}$ | 17.6 | GOOD | A |
| | 4 | A | 1.06 | 10$^{12}$ | 18.4 | GOOD | A |
| Com. Ex. | 1 | D | 1.07 | 10$^{12}$ | 19.2 | GOOD | A |
| | 2 | C | 1.37 | 10$^{12}$ | 20.2 | GOOD | B |
| | 3 | C | 0.97 | 10$^{12}$ | 12.8 | GOOD | B |
| | 4 | A | 1.27 | 10$^{12}$ | 18.2 | USUAL | A |
| | 5 | A | 1.31 | 10$^{12}$ | 11.9 | GOOD | A |
| | 6 | D | 0.92 | 10$^{12}$ | 21.7 | GOOD | A |

*Based on the weight of the polyester resin
**Based on the weight of the resin mixture
OBS-K: potassium octylbenzenesulfonate
TM-K: tetrakis(3,5-di-t-butylhydroxyphenylpropanoyloxymethyl)methane As the above results clearly show, the biaxially oriented polymer films prepared in accordance with the present invention have good surface properties, by way of controlling the size and area of the pores contained in the film.

While the invention has been described with respect to the above specific embodiments, it should be recognized that various modifications and changes may be within the scope of the invention as defined by the claims the follow.

What is claimed is:

1. A white-colored polymer film having elongated spherical pores, which is characterized in that said pores exposed on a surface created by cutting the film along a longitudinal direction satisfy the following formulae:

$$P_{L,90} \geq 5 \, \mu m \qquad P_{D,90} \geq 0.1 \, \mu m$$
$$P_{L/D,50} \geq 5 \qquad 100 \geq P_N \geq 10$$
$$0.5 \geq P_A \geq 0.05$$

wherein, $P_{L,90}$ is an average length of longer axes of 90% or more of the exposed pores;

$P_{D,90}$ is an average length of shorter axes of 90% or more of the exposed pores;

$P_{L/D,50}$ is an average of the longer axis to the shorter axis length ratios of the exposed pores;

$P_N$ is the number of exposed pores per 1000 μm$^2$ of the exposed surface; and $P_A$ is the ratio of the exposed pore area to the exposed surface area, said polymer film being prepared by compounding and melt-extruding a resinous composition comprising a mixture of 65 to 95% by weight of a polyester resin and 5 to 35% by weight of a polyolefin resin, and, based on the weight of the polyester resin, 0.01 to 10% by weight of inorganic particles having an average particle diameter ranging from 0.01 to 10 μm, 0.01 to 1.0% by weight of a metal sulfonate and 0.005 to 0.5% by weight of a hindered phenol, to form a sheet, and then biaxially extending the sheet.

2. The film of claim 1 wherein the polyester resin is polyethylene terephthalate or polyethylene naphthalate.

3. The film of claim 1 wherein the polyolefin resin is a copolymer of two or more components selected from the group consisting of ethylene, propylene, butene, pentene, hexene and octene.

4. The film of claim 1 wherein the metal sulfonate is represented by formula (I) having an acid value of 1.0 mg KOH/g or less:

$$R_1\text{---}SO_3Me \qquad (I)$$

wherein, $R_1$ is a $C_5$–$C_{20}$ alkyl group; and

Me is Li, Na, K or Mg.

5. The film of claim 1 wherein the inorganic particles are selected from the group consisting of particles of barium sulfate, titanium oxide, silicon dioxide, calcium carbonate, magnesium oxide, talc, zeolite and a mixture thereof.

* * * * *